(12) United States Patent
Kwon et al.

(10) Patent No.: US 12,049,256 B2
(45) Date of Patent: Jul. 30, 2024

(54) MOBILITY VEHICLE PLATFORM

(71) Applicants: Hyundai Motor Company, Seoul (KR); Kia Corporation, Seoul (KR)

(72) Inventors: Seok Ryung Kwon, Seoul (KR); Hyeon Sik Shin, Hwaseong-si (KR); Pan Keun Baek, Osan-si (KR); Jun Hwan Park, Seoul (KR); Hun Keon Ko, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 245 days.

(21) Appl. No.: 17/839,854

(22) Filed: Jun. 14, 2022

(65) Prior Publication Data
US 2023/0144878 A1    May 11, 2023

(30) Foreign Application Priority Data
Nov. 10, 2021 (KR) .................. 10-2021-0154215

(51) Int. Cl.
*B62D 24/04* (2006.01)
*B60L 50/60* (2019.01)
(Continued)

(52) U.S. Cl.
CPC .............. *B62D 24/04* (2013.01); *B60L 50/60* (2019.02); *B60R 19/24* (2013.01); *B62D 1/20* (2013.01);
(Continued)

(58) Field of Classification Search
CPC .......... B62D 24/04; B62D 1/20; B62D 26/00; B62D 7/023; B62D 5/0418; B62D 25/16;
(Continued)

(56) References Cited

U.S. PATENT DOCUMENTS 5,265,686 A * 11/1993 Machen ................ B62B 5/0026
                                                                180/443
7,044,526 B2    5/2006 Tweet et al.
(Continued)

FOREIGN PATENT DOCUMENTS

CN        111907615 A  * 11/2020  ........... B60K 7/0007
JP        2013193705 A     9/2013
(Continued)

*Primary Examiner* — Karen Beck
(74) *Attorney, Agent, or Firm* — Slater Matsil, LLP (57) ABSTRACT

In an embodiment a mobility vehicle platform includes a body part open toward an upper side and configured to receive a cabin at the upper side and a wheel part detachably connected to the body part, wherein the wheel part includes a steering member rotatable about an axis extending in an upward/downward direction, a wheel member connected to the steering member and configured to contact a ground surface, and a coupling member, into which the steering member is inserted, and detachably mounted to the body part, wherein the body part includes a body member configured to receive the cabin at an upper side thereof, and a protruding member coupled to the body member to protrude toward an outside of the body member, and to which the coupling member is coupled, and wherein the coupling member includes a first coupling part extending upwards and a second coupling part extending from an upper end of the first coupling part toward the body part.

17 Claims, 10 Drawing Sheets

(51) Int. Cl.
  *B60R 19/24* (2006.01)
  *B62D 1/20* (2006.01)
  B60K 1/04 (2019.01)
  B60R 19/00 (2006.01)
(52) U.S. Cl.
  CPC . *B60K 2001/0416* (2013.01); *B60R 2019/002* (2013.01); *B60Y 2200/91* (2013.01)
(58) Field of Classification Search
  CPC ......... B62D 27/00; B60L 50/60; B60R 19/24; B60R 2019/002; B60K 2001/0416; B60Y 2304/05
  See application file for complete search history.

(56) References Cited

U.S. PATENT DOCUMENTS

| | | | |
|---|---|---|---|
| 2018/0099555 A1* | 4/2018 | Yang | B62D 7/026 |
| 2019/0210470 A1 | 7/2019 | Thomas et al. | |
| 2020/0189656 A1 | 6/2020 | Hiroe et al. | |
| 2021/0101641 A1 | 4/2021 | Kim et al. | |
| 2021/0197897 A1* | 7/2021 | Sardes | B62D 63/025 |
| 2022/0297742 A1* | 9/2022 | Kwon | B62D 7/023 |
| 2023/0144878 A1* | 5/2023 | Kwon | B62D 23/00 |
| | | | 296/190.08 |
| 2023/0158882 A1* | 5/2023 | Min | B60K 17/30 |
| | | | 180/65.51 |

FOREIGN PATENT DOCUMENTS

| | | | | |
|---|---|---|---|---|
| KR | 101409379 B1 | 7/2014 | | |
| KR | 102029678 B1 | 10/2019 | | |
| KR | 2023093088 A * | 6/2023 | | B25J 5/007 |

\* cited by examiner

MOBILITY VEHICLE PLATFORM

CROSS-REFERENCE TO RELATED APPLICATIONS

This application claims the benefit of priority to Korean Patent Application No. 10-2021-0154215, filed in the Korean Intellectual Property Office on Nov. 10, 2021, the entire contents of which are incorporated herein by reference.

TECHNICAL FIELD

The present disclosure relates to a mobility vehicle platform.

BACKGROUND

In general, a platforming strategy of designing a vehicle platform that shares some common components are widely used in the automobile manufacturing industries for reduction of component costs due to economy of scale and easiness of change of designs.

In particular, an electric vehicle includes one lower platform, and various kinds of upper cabins are fixed to the lower platform, so that a method of producing various kinds of electric vehicles according to purposes is possible. For example, an upper cabin manufactured according to purposes, such as a food truck, an ambulance, unmanned delivery, is installed in a lower platform, in which a driving unit is installed, or an existing upper cabin is replaced by an upper cabin for another purpose, so that different kinds of vehicles may be manufactured according to necessities. This is called a purpose built mobility vehicle or a purpose built vehicle (PBV), and corresponds to a base of future industries suggested by several vehicle manufacturers.

Meanwhile, a conventional lower platform may be moved only forwards and rearwards by using wheel like a general vehicle. It is impossible for the conventional lower platform to perform an operation, such as leftward and rightward movements. Accordingly, as an example, a traffic line may become longer by using a method of being moved rearwards after being moved to a left front side by using a handle when a leftward movement is desired.

SUMMARY

Embodiments solve the above-mentioned problems occurring in the prior art while advantages achieved by the prior art are maintained intact.

Embodiments provide a mobility vehicle platform that may be moved in various movement directions including leftward/rightward movements.

The technical problems to be solved by the present disclosure are not limited to the aforementioned problems, and any other technical problems not mentioned herein will be clearly understood from the following description by those skilled in the art to which the present disclosure pertains.

According to an embodiment, a mobility vehicle platform includes a body part opened toward an upper side and configured such that a cabin is coupled to an upper side thereof, and a wheel part connected to the body part to be detachable, the wheel part includes a steering member being rotatable about an axis extending in an upward/downward direction, a wheel member connected to the steering member and that contacts a ground surface, and a coupling member, into which the steering member is inserted, and mounted on the body part to be detachable, the body part includes a body member configured such that the cabin is coupled to an upper side thereof, and a protruding member coupled to the body member to protrude toward an outside of the body member, and to which the coupling member is coupled, the coupling member includes a first coupling part extending upwards, and a second coupling part extending from an upper end of the first coupling part toward the body part, the steering member is coupled to the first coupling part, and the protruding member supports a lower surface of the second coupling part upwards.

In another example, the first coupling part may contact an outer side surface of the protruding member, and the second coupling part may contact an upper surface of the protruding member.

In another example, an outer circumferential surface of the first coupling part on left and right sides may have a partial shape of a cylinder.

In another example, a through-hole may pass through the first coupling part in an upward/downward direction, and an upper end of the steering member may be inserted into the through-hole.

In another example, the body part may include a wheel cover member disposed on an upper side of the wheel member, and having an arc shape to surround the wheel member, and the wheel cover member may include a pair of guide parts each having a groove having an arc shape when viewed from an outside and recessed inwards, and spaced apart from each other while facing each other, and a plurality of cover parts disposed between the pair of guide parts, sides of which are inserted into the recesses, and that covers the wheel member.

In another example, the plurality of recesses may be formed to correspond to the number of the plurality of cover parts, and shapes of the sides of the cover part may correspond to shapes of the recesses.

In another example, the protruding member may include a first protruding member coupled to a left side of the body member, and a second protruding member coupled to a right side of the body member, the coupling member may include a first coupling member coupled to the first protruding member, and a second coupling member coupled to the first protruding member, and the body part may further include a reinforcing member extending in a leftward/rightward direction, and adhered to the first protruding member, the second protruding member, the first coupling member, and the second coupling member.

In another example, the first protruding member may include a (1-1)-th protruding member coupled to a front left side of the body member, and a (1-2)-th protruding member coupled to a rear left side of the body member, the second protruding member include a (2-1)-th protruding member coupled to a front right side of the body member, and a (2-2)-th protruding member coupled to a rear right side of the body member, the first coupling member may include a (1-1)-th coupling member coupled to the (1-1)-th protruding member, and a (1-2)-th coupling member coupled to the (1-2)-th protruding member, the second coupling member may include a (2-1)-th coupling member coupled to the (2-1)-th protruding member, and a (2-2)-th coupling member coupled to the (2-2)-th protruding member, and the reinforcing member may include a front reinforcing member connected to the (1-1)-th protruding member, the (2-1)-th protruding member, the (1-1)-th coupling member, and the (2-1)-th coupling member, and a rear reinforcing member connected to the (1-2)-th protruding member, the (2-2)-th protruding member, the (1-2)-th coupling member, and the (2-2)-th coupling member.

In another example, the front reinforcing member may be adhered to a front surface of the (1-1)-th protruding member, a front surface of the (2-1)-th protruding member, a front surface of the (1-1)-th coupling member, and a front surface of the (2-1)-th coupling member, and the rear reinforcing member may be adhered to a rear surface of the (1-2)-th protruding member, a rear surface of the (2-2)-th protruding member, a rear surface of the (1-2)-th coupling member, and a rear surface of the (2-2)-th coupling member.

In another example, the body part may include a seat member disposed on an upper side of the body member and configured such that a passenger is seated thereon, and a pair of reception members disposed between the body member and the seat member to support the seat member, spaced apart from each other in leftward/rightward direction, and in which a wiring line is received in a space therebetween.

In another example, a pass-hole, through which the wiring line passes, may be formed on a side surface of the reception member.

In another example, the body part may include a battery member disposed at a portion of the body member, which is located on a rear side of the seat member, and that supplies electric power, and a control member disposed at a portion of the body member, which is located one at least any one of a left side or a right side of the seat member, and that controls movement of the wheel part.

In another example, the body part may include a front bumper member coupled to a front surface of the body member, and of which a front left side and a front right side are rounded, and a rear bumper member coupled to a rear surface of the body member, and of which a rear left side and a rear right side are rounded.

In another example, the front bumper member may include a pair of first front bumper parts coupled to a front surface of the body member to extend forwards, and spaced apart from each other in a leftward/rightward direction, and a second front bumper part coupled to front surfaces of the pair of first front bumper parts and of which a front left side and a front right side are rounded.

In another example, the protruding member may include a first protruding part that contacts the first coupling part and the second coupling part and of which a width in a leftward/rightward direction is constant, and a second protruding part disposed on a lower side of the first protruding part and of which a width in the leftward/rightward direction becomes shorter as it goes to a lower side.

In another example, a first insertion recess may be formed in a first contact area that is an area of the body member, which contacts the protruding member, a second insertion recess having a shape corresponding to the first insertion recess may be formed in a second contact area that is an area of the protruding member, which contacts the body member, and the body part may further include an insertion member that is inserted into both of the first insertion recess and the second insertion recess.

In another example, the insertion member may have a slot shape, and the first insertion recess and the second insertion recess may have shapes corresponding to the insertion member, and have width that are smaller than a width of the insertion member.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Hereinafter, some embodiments of the present disclosure will be described in detail with reference to the exemplary drawings. In providing reference numerals to the constituent elements of the drawings, the same elements may have the same reference numerals even if they are displayed on different drawings. Further, in the following description of the present disclosure, a detailed description of known functions and configurations incorporated herein will be omitted when it may make the subject matter of the present disclosure rather unclear.

Figure 1:
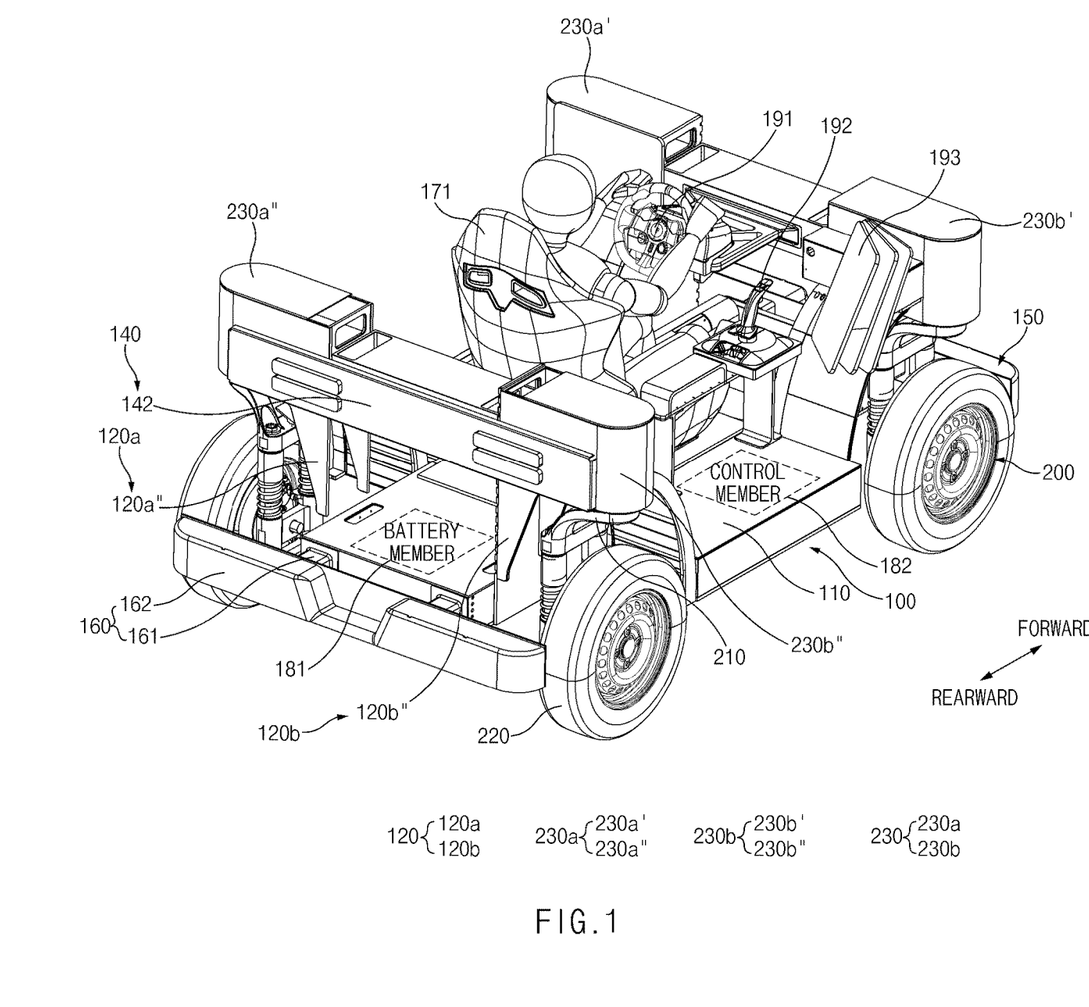
FIG. 1 is a view illustrating a mobility vehicle platform according to an embodiment of the present disclosure.
Figure 2:
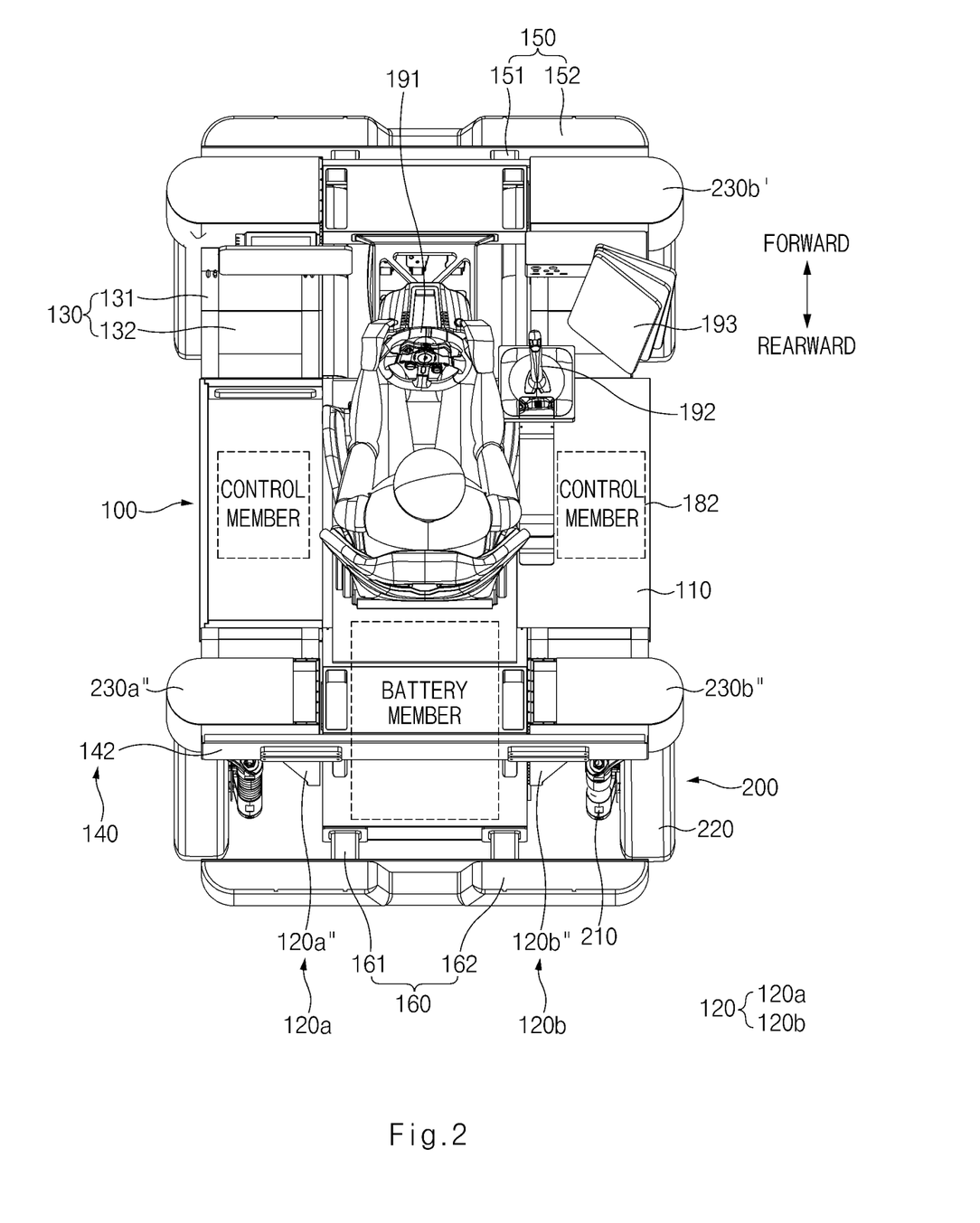
FIG. 2 is a view illustrating a mobility vehicle platform according to an embodiment of the present disclosure, when viewed from a top.
Figure 3:
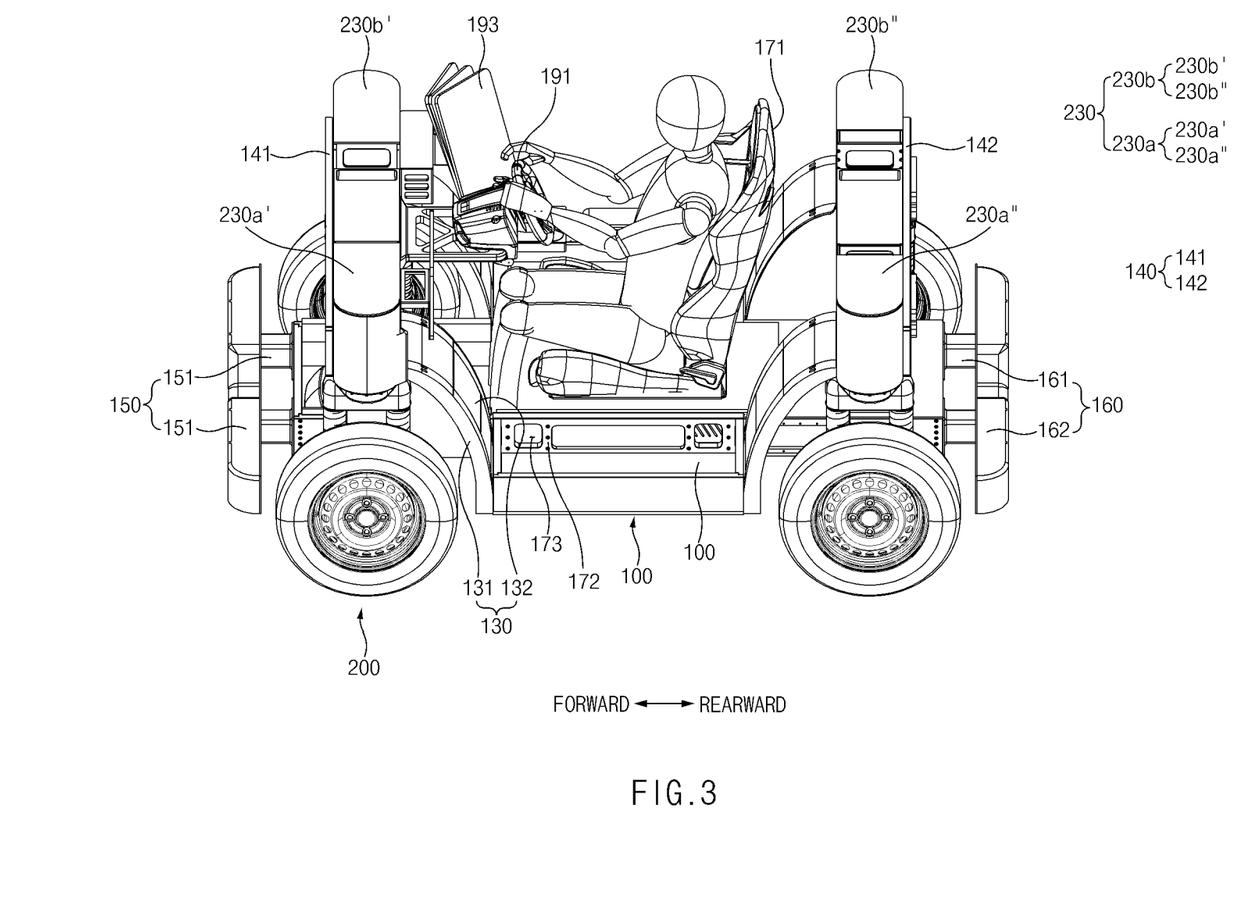
FIG. 3 is a view illustrating a mobility vehicle platform according to an embodiment of the present disclosure, when viewed from a left side.
Figure 4:
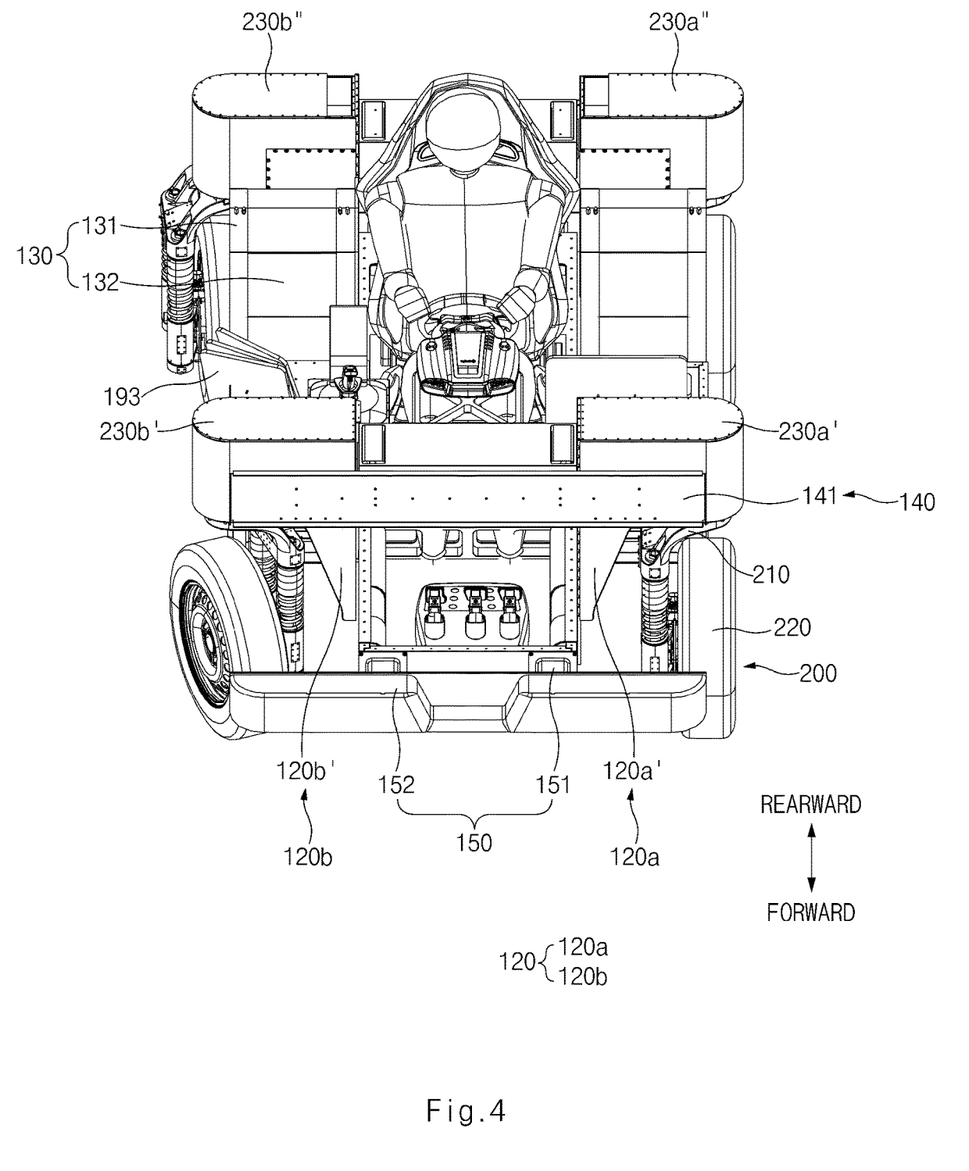
FIG. 4 is a view illustrating a mobility vehicle platform according to an embodiment of the present disclosure, when viewed from a front side.
Figure 5:
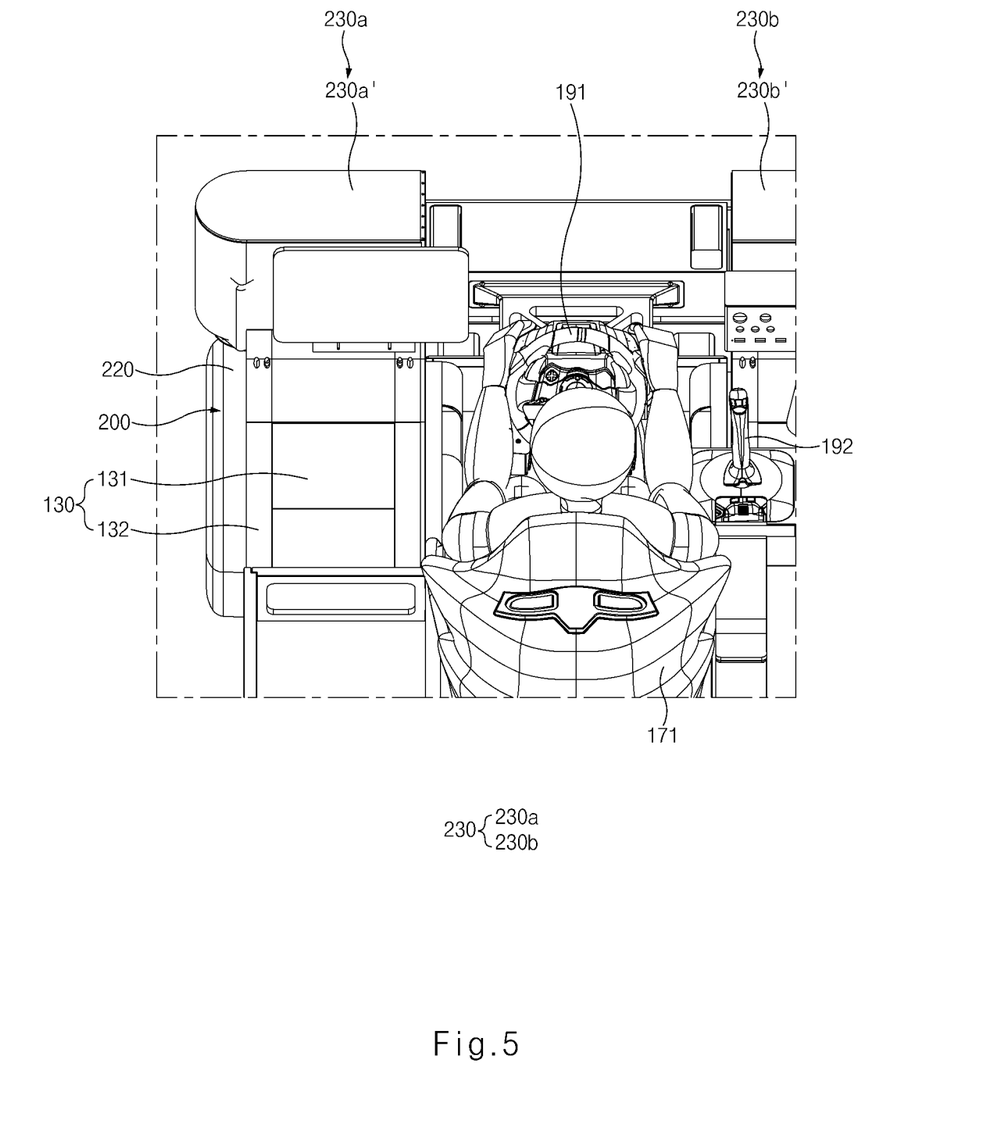
FIG. 5 is a partially enlarged view of FIG. 2.
Figure 6:
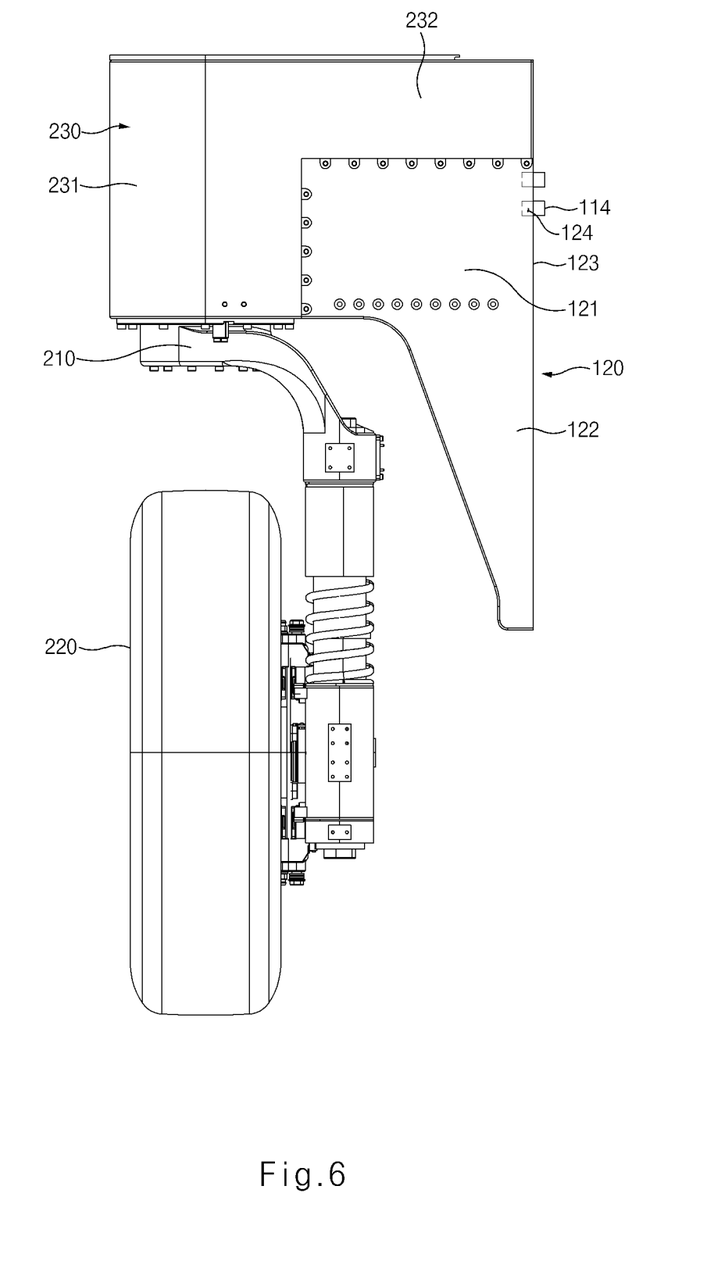
FIG. 6 is a view illustrating a wheel part and a protruding member.

FIG. 1 is a view illustrating a mobility vehicle platform according to an embodiment of the present disclosure. FIG. 2 is a view illustrating a mobility vehicle platform according to an embodiment of the present disclosure, when viewed from a top. FIG. 3 is a view illustrating a mobility vehicle platform according to an embodiment of the present disclosure, when viewed from a left side. FIG. 4 is a view illustrating a mobility vehicle platform according to an embodiment of the present disclosure, when viewed from a front side. FIG. 5 is a partially enlarged view of FIG. 2. FIG. 6 is a view illustrating a wheel part and a protruding member.

A mobility vehicle platform according to an embodiment of the present disclosure may be a lower platform that may be applied to a lower side of a mobility vehicle. The mobility vehicle platform according to the embodiment of the present disclosure may include a body part wo and a wheel part 200.

Body Part 100

The body part wo may be opened toward an upper side, and a cabin may be provided on an upper side thereof to be coupled thereto. The cabin may have various shapes according to a purpose of a mobility vehicle. As an example, a cabin for a food truck may include a facility or an apparatus, such as a fuel intake, which is necessary for cooking. As another example, a cabin for an ambulance may include a facility or an apparatus, such as a defibrillator, which is necessary for an emergency situation.

The body part 100 may include a body member no and a protruding member 120. The cabin (not illustrated) may be provided on an upper side of the body member no to be coupled thereto.

The protruding member 120 may be coupled to the body member no to protrude in an outward direction of the body member 110. As an example, the outward direction may be a leftward/rightward direction. A coupling member 230, which will be described below, may be coupled to the protruding member 120.

Wheel Part 200

The wheel part 200 may be connected to the body part 100 to be detachable. The body part 100 may include a steering member 210, a wheel member 220, and the coupling member 230. The steering member 210 may be provided to be rotated about an axis that extends in an upward/downward direction. The steering member 210 may be connected to a motor (not illustrated).

The wheel member 220 may be connected to the steering member 210, and may contact a ground surface. The wheel member 220 may include a wheel and a tire. Because a plurality of wheel parts 200 may be provided and each of the wheel parts 200 includes the steering member 210, the wheel member 220 may be rotated about an axis that extends in an upward/downward direction. Then, the steering members 210 may be driven such that rotational angles thereof are independent.

According to the present disclosure, because the wheel member 220 is connected to the steering member 210 that may be rotated about an axis that extends in an upward/downward direction, the mobility vehicle platform may be moved in various directions including a left/rightward direction. For example, when the mobility vehicle platform is to be moved in leftwards and rightwards, the steering member 210 may arrange the wheel member 220 such that the wheel member 220 faces the leftward/rightward direction through rotation thereof by 90 degrees.

The steering member 210 may be inserted into the coupling member 230. Furthermore, the coupling member 230 may be mounted on the body part 100 to be detachable. In more detail, the coupling member 230 may be coupled to the protruding member 120.

According to the present disclosure, because the wheel part 200 and the body part 100 are connected to each other by coupling the protruding member 120 to the coupling member 230, it may be convenient to replace the wheel parts 200, respectively.

Figure 7:
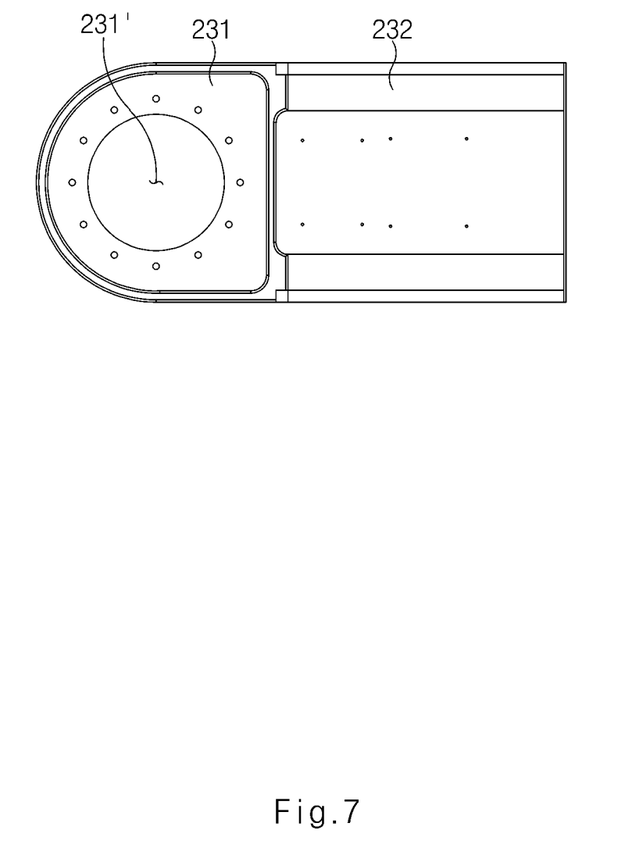
FIG. 7 is a top view of a coupling member.

The coupling member 230 may include a first coupling part 231 and a second coupling part 232. The first coupling part 231 may extend upwards. FIG. 7 is a top view of a coupling member. As illustrated in FIGS. 6 and 7, an outer circumferential surface of the first coupling part 231 in a leftward/rightward direction may have a partial shape of a cylinder.

The steering member 210 may be coupled to the first coupling part 231. For example, as illustrated in FIG. 7, a through-hole 231' may pass through the first coupling part 231 in the upward/downward direction, and an upper end of the steering member 210 may be inserted into the through-hole 231'.

The second coupling part 232 may extend from an upper end of the first coupling part 231 toward the body part 100. In summary, the coupling member 230 may have an "L" shape as a whole.

Meanwhile, the protruding member 120 may support a lower surface of the second coupling part 232 upwards. Through this, a load that is to be applied to the wheel part 200 may be received by the protruding member 120 to secure strength.

The first coupling part 231 may contact side surfaces of the protruding member 120 in left and right outward directions. Furthermore, the second coupling part 232 may contact an upper surface of the protruding member 120. Through this, the protruding member 120 may support the first coupling part 231 toward left and right outer sides, and may support the second coupling part 232 upwards. Accordingly, as compared with a case, in which only the first coupling part 231 is supported outward or only the second coupling part 232 is supported upwards, there may be a low possibility of distortion of the protruding member 120 by the coupling member 230.

The protruding member 120 may include a first protruding part 121 and a second protruding part 122. The first protruding part 121 may contact the first coupling part 231 and the second coupling part 232, and may be configured such that an upward/downward height and a leftward/rightward width thereof are constant. The second protruding part 122 may be disposed on a lower side of the first protruding part 121, and a leftward/rightward width thereof may become shorter as it goes to a lower side.

Wheel Cover Member 130

As illustrated in FIG. 5, the body part 100 may include a wheel cover member 130. The wheel cover member 130 is a configuration for protecting the wheel member 220, and the wheel cover member 130 may be disposed on an upper side of the wheel member 220 and may have an arc shape to surround the wheel member 220. The wheel cover member 130 may include a guide part 131 and a cover part 132.

Figure 8:
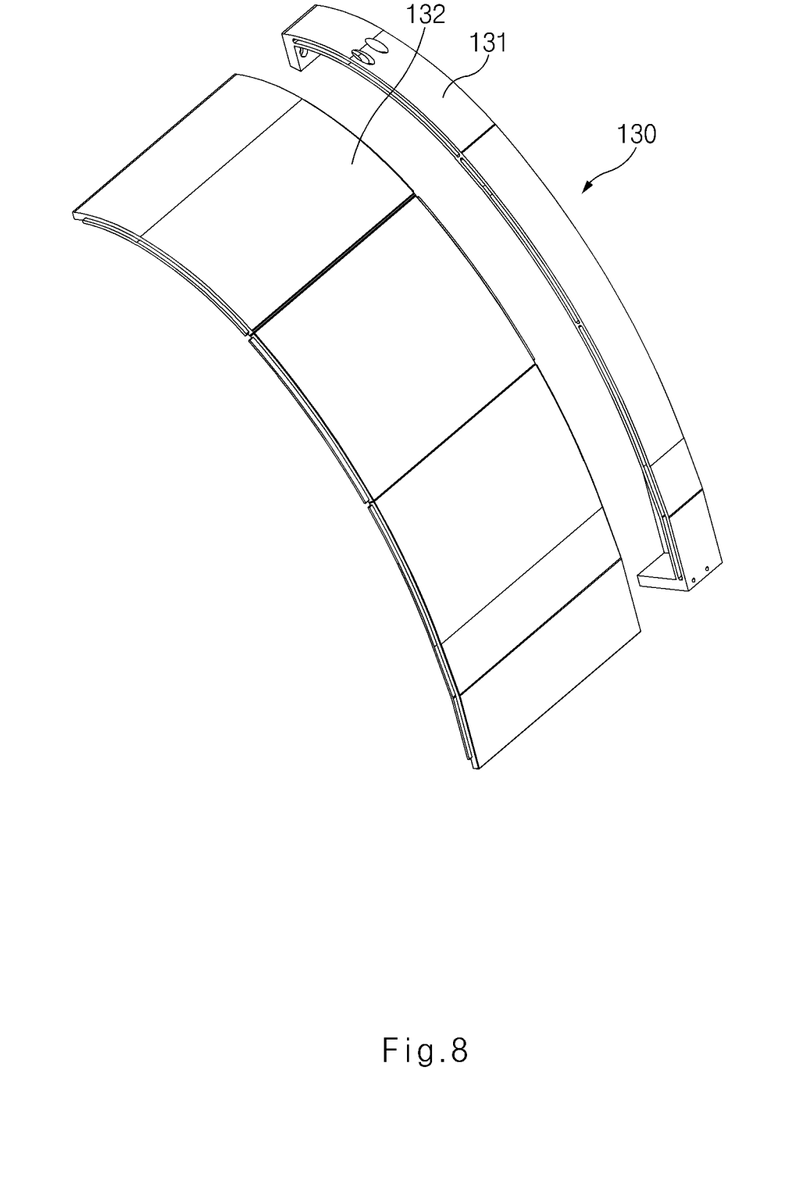
FIG. 8 is a view illustrating a wheel cover member.

FIG. 8 is a view illustrating a guide part and a cover part. As illustrated in FIG. 8, the guide part 131 may have a groove having an arc shape when viewed from an outside and recessed inwards. As illustrated in FIG. 5, a pair of guide parts 131 may be provided, and may be disposed to be spaced apart from each other while the cover part 132 being interposed therebetween.

A plurality of cover parts 132 may be provided, and the cover parts 132 may be disposed between the pair of guide parts 131 to cover the wheel part 200. The plurality of cover parts 132 may constitute a structure, in which they are assembled with each other, and the plurality of cover parts 132 may be integrally formed to be divided into a plurality of areas. Meanwhile, a recessed area may be formed at a border of two adjacent cover parts 132. A side of the cover part 132 may be inserted into the groove of the guide part 131. A plurality of grooves may be formed to correspond to the number of the plurality of cover parts 132. Furthermore, a shape of the side of the cover part 132 may correspond to a shape of the groove.

Reinforcing Member 140

The body part 100 may include a reinforcing member 140. Hereinafter, for a description of the reinforcing member 140, a description of the protruding member 120 and the coupling member 230 will be made below in detail according to locations thereof.

The protruding member 120 may include a first protruding member 120a and a second protruding member 120b. The first protruding member 120a may be coupled to a left side of the body member 110. The second protruding member 120b may be coupled to a right side of the body member 110.

The coupling member 230 may include a first coupling member 230a and a second coupling member 230b. The first coupling member 230a may be coupled to the first protruding member 120a. The second coupling member 230b may be coupled to the second protruding member 120b.

The reinforcing member 140 may extend in a leftward/rightward direction, and may be adhered to the first protruding member 120a, the second protruding member 120b, the first coupling member 230a, and the second coupling member 230b.

The first protruding member 120a may include a (1-1)-th protruding member 120a' (see FIG. 4) and a (1-2)-th protruding member 120a". The (1-1)-th protruding member 120a' may be coupled to a front left side of the body member 110. The (1-2)-th protruding member 120a" may be coupled to a rear left side of the body member 110.

The second protruding member 120b may include a (2-1)-th protruding member 120b' (see FIG. 4) and a (2-2)-th protruding member 120b". The (2-1)-th protruding member 120b' may be coupled to a front right side of the body member 110. The (2-2)-th protruding member 120b" may be coupled to a rear right side of the body member 110.

The first coupling member 230a may include a (1-1)-th coupling member 230a' and a (1-2)-th coupling member 230a". The (1-1)-th coupling member 230a' may be coupled to the (1-1)-th protruding member 120a'. The (1-2)-th coupling member 230a" may be coupled to the (1-2)-th protruding member 120a".

The second coupling member 230b may include a (2-1)-th coupling member 230b' (see FIG. 4) and a (2-2)-th coupling member 230b". The (2-1)-th coupling member 230b' may be coupled to the (2-1)-th protruding member 120b'. The (2-2)-th coupling member 230b" may be coupled to the (2-2)-th protruding member 120b".

As illustrated in FIG. 3, the reinforcing member 140 may include a front reinforcing member 141 and a rear reinforcing member 142. The front reinforcing member 141 may be connected to the (1-1)-th protruding member 120a', the (2-1)-th protruding member 120b', the (1-1)-th coupling member 230a', and the (2-1)-th coupling member 230b'. As an example, the front reinforcing member 141 may be adhered to a front surface of the (1-1)-th protruding member 120a', a front surface of the (2-1)-th protruding member 120b', a front surface of the (1-1)-th coupling member 230a', and a front surface of the (2-1)-th coupling member 230b'.

The rear reinforcing member 142 may be connected to the (1-2)-th protruding member 120a", the (2-2)-th protruding member 120b", the (1-2)-th coupling member 230a", and the (2-2)-th coupling member 230b". As an example, the rear reinforcing member 142 may be adhered to a rear surface of the (1-2)-th protruding member 120a", a rear surface of the (2-2)-th protruding member 120b", a rear surface of the (1-2)-th coupling member 230a", and a rear surface of the (2-2)-th coupling member 230b". A rear lamp may be coupled to the rear reinforcing member 142.

Front Bumper Member 150

The body part 100 may include a front bumper member 150. The front bumper member 150 may be coupled to a front surface of the body member no, and a front left side and a front right side thereof may be rounded.

The front bumper member 150 may include a first front bumper part 151 and a second front bumper part 152. A pair of first front bumper pails 151 may be provided, may be coupled to a front surface of the body member no to extend to a front side, and may be spaced apart from each other leftwards and rightwards. The second front bumper pall 152 may be coupled to front surfaces of the pair of first front bumper parts, and a front left side and a front right side thereof may be rounded.

Rear Bumper Member 160

The body part 100 may include a rear bumper member 160. The rear bumper member 160 may be coupled to a rear surface of the body member no, and a rear left side and a rear right side thereof may be rounded.

The rear bumper member 160 may include a first rear bumper part 161 and a second rear bumper part 162. A pair of first rear bumper pails 161 may be provided, may be coupled to a rear surface of the body member no to extend to a rear side, and may be spaced apart from each other leftwards and rightwards. The second rear bumper part 162 may be coupled to front surfaces of the pair of first rear bumper parts, and a rear left side and a rear right side thereof may be rounded.

Seat Member 171 and Reception Member 172

The body part 100 may include a seat member 171 and a reception member 172. The seat member 171 may be disposed on an upper side of the body member 110, and may be configured such that a passenger may be seated thereon. The reception member 172 may be disposed between the body member no and the seat member 171 to support the seat member 171. A pair of reception members 172 may be spaced apart from each other leftwards and rightwards. A wiring line may be received in a space between the pair of reception members 172. A pass-hole 173, through which a wiring line may pass, may be formed on a side surface of the reception member 172.

Battery Member 181 and Control Member 182

The body part 100 may further include a battery member 181 and a control member 182. The battery member 181 may be disposed at a portion of the body member 110, which is located on a rear side of the seat member 171, to supply electric power. The control member 182 may be disposed at a portion of the body member 110, which is located one at least any one of a left side or a right side of the seat member 171, and may control movement of the wheel part 200.

The control member 182 may further include a processor and a memory. The processor may include a microprocessor such as a field Programmable gate array (FPGA), an application specific integrated circuit (ASIC), a central processing unit (CPU). The memory may store control instructions that are basic in generating instructions for controlling movement of the wheel part 200 by the processor. The memory may be data storage such as a hard disk drive (HDD), a solid state drive (SSD), a volatile medium, and a nonvolatile medium.

Handle 191, Joystick 192, and Display 193

The body part 100 may include a handle 191, a joystick 192, and a display 193. The handle 191 and the joystick 192 may rotate the steering member 210. A user may rotate the steering member 210 with the handle 191 of the joystick 192 if necessary. The display 193 may display information related to driving, including a driving speed and a vehicle state.

Load Dispersing Structure

Hereinafter, a structure for dispersing a load when the protruding member 120 and the body member no are coupled to each other will be described below. As will be described below, the structure for dispersing a load when the protruding member 120 and the body member no are coupled to each other may be a first insertion recess 113, a second insertion recess 124, and an insertion member 114.

Figure 9:
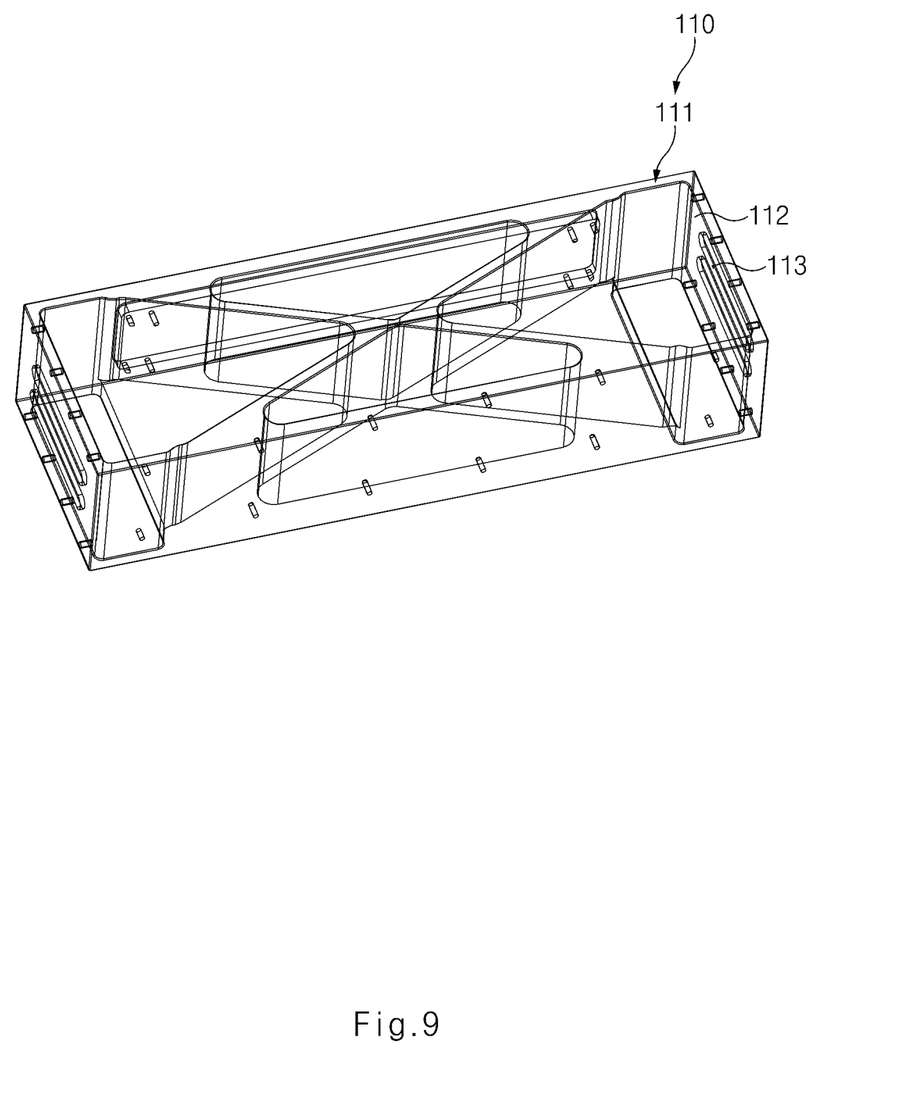
FIG. 9 is a perspective view of a contact part.
Figure 10:
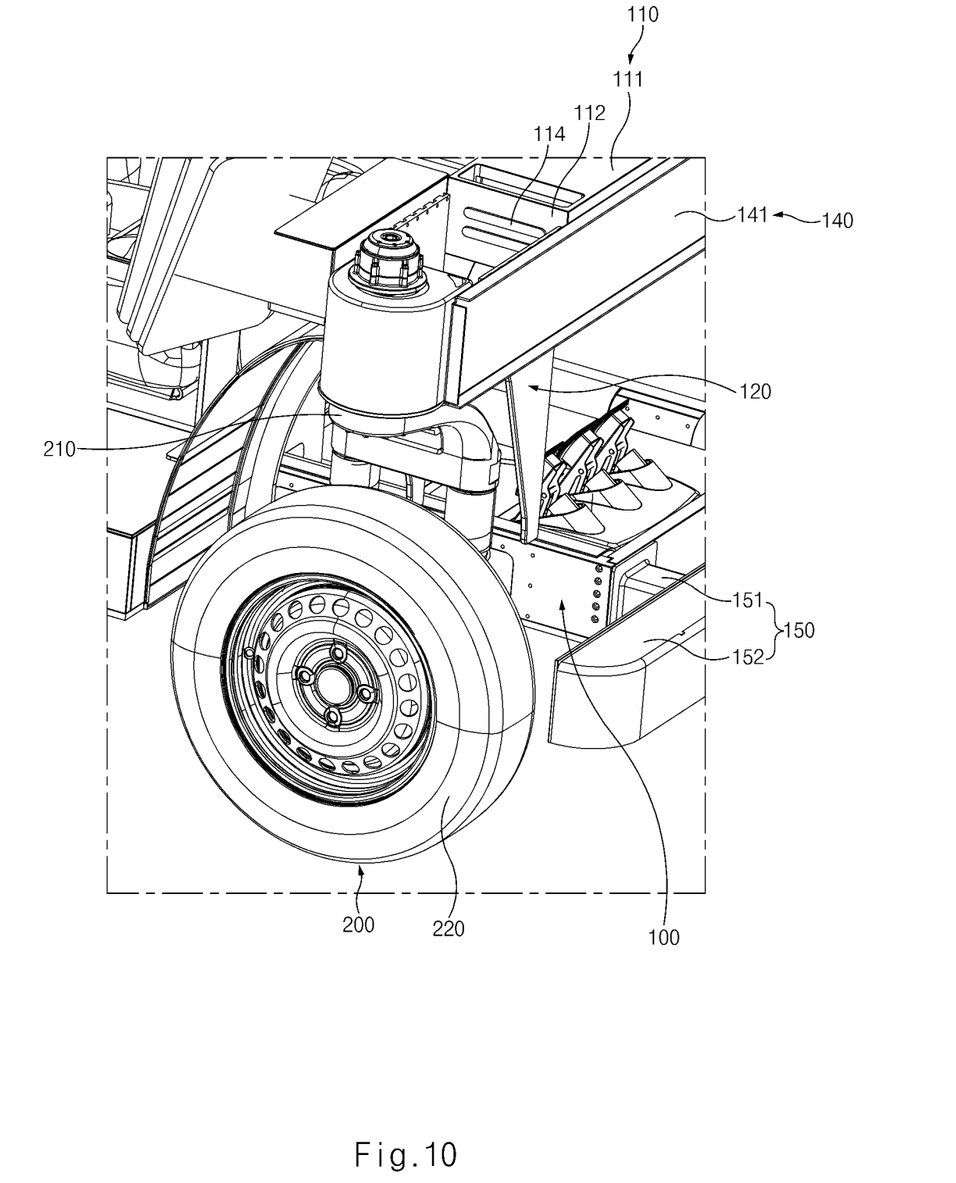
FIG. 10 is a view illustrating a first contact area and an insertion member.

FIG. 9 is a perspective view of a contact part. FIG. 10 is a view illustrating a first contact area and an insertion member. The first insertion recess 113 may be formed in a first contact area 112 that is an area of the body member 110, which contacts the protruding member 120. The first contact area 112 may be a portion of a contact part 111. The contact part 111 may be a part that is located on a front side or a rear side of the body member 110. For reference, for convenience of illustration, the coupling member is omitted in FIG. 10.

The second insertion recess 124 (see FIG. 6) may be formed in a second contact area 123 (see FIG. 6) that is an area of the protruding member 120, which contacts the body member 110. The second insertion recess 124 may have a shape corresponding to the first insertion recess 113.

Meanwhile, the body part 100 may further include the insertion member 114. The insertion member 114 may be inserted into both of the first insertion recess 113 and the second insertion recess 124 (FIG. 6). The insertion member 114 may have a slot shape.

The first insertion recess 113 and the second insertion recess 124 may have shapes corresponding to the insertion member 114. Further, the first insertion recess 113 and the second insertion recess 124 may have widths that are narrower than the insertion member 114 in a leftward/rightward direction. Accordingly, the insertion member 114 may be inserted into both of the first insertion recess 113 and the second insertion recess 124.

According to the structure, because the insertion member 114 is inserted into both of the first insertion recess 113 of the body member no and the second insertion recess 124 of the protruding member 120, a load that is to be received by a bolt of the protruding member 120 may be dispersed by the insertion member 114.

According to the present disclosure, because the wheel member is connected to the steering member that may be rotated about an axis that extends in an upward/downward direction, the mobility vehicle platform may be moved in various directions including a left/rightward direction.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A mobility vehicle platform comprising:
   a body part open toward an upper side and configured to receive a cabin at the upper side; and
   a wheel part detachably connected to the body part,
   wherein the wheel part includes:
      a steering member rotatable about an axis extending in an upward/downward direction,
      a wheel member connected to the steering member and configured to contact a ground surface, and
      a coupling member, into which the steering member is inserted, and detachably mounted to the body part,
   wherein the body part includes:
      a body member configured to receive the cabin at an upper side thereof, and
      a protruding member coupled to the body member to protrude toward an outside of the body member, and to which the coupling member is coupled,
   wherein the coupling member includes:
      a first coupling part extending upwards, and
      a second coupling part extending from an upper end of the first coupling part toward the body part,
   wherein the steering member is coupled to the first coupling part, and
   wherein the protruding member supports a lower surface of the second coupling part upwards.

2. The mobility vehicle platform of claim 1, wherein the first coupling part contacts an outer side surface of the protruding member, and wherein the second coupling part contacts an upper surface of the protruding member.

3. The mobility vehicle platform of claim 2, wherein an outer surface of the first coupling part on left and right sides has a partial shape of a cylinder.

4. The mobility vehicle platform of claim 2,
   wherein a through-hole passes through the first coupling part in an upward/downward direction, and
   wherein an upper end of the steering member is inserted into the through-hole.

5. The mobility vehicle platform of claim 1, wherein the body part comprises:
   a wheel cover member disposed on an upper side of the wheel member, the wheel cover member comprising:
   an arc shape to surround the wheel member,
   a pair of guide parts each having an arc shape when viewed from an outside, the guide parts having a groove recessed inwards and being spaced apart from each other while facing each other, and
   a plurality of cover parts disposed between the pair of guide parts, sides of which are inserted into the recesses, and configured to cover the wheel member.

6. The mobility vehicle platform of claim 5,
   wherein a plurality of recesses are formed to correspond to the plurality of cover parts, and
   wherein shapes of the sides of the cover part correspond to shapes of the recesses.

7. The mobility vehicle platform of claim 1,
   wherein the protruding member includes:
      a first protruding member coupled to a left side of the body member, and
      a second protruding member coupled to a right side of the body member,
   wherein the coupling member includes:
      a first coupling member coupled to the first protruding member, and
      a second coupling member coupled to the first protruding member, and
   wherein the body part further includes a reinforcing member extending in a leftward/rightward direction, the reinforcing member being adhered to the first protruding member, the second protruding member, the first coupling member, and the second coupling member.

8. The mobility vehicle platform of claim 7,
   wherein the first protruding member includes:
      a (1-1)-th protruding member coupled to a front left side of the body member, and a (1-2)-th protruding member coupled to a rear left side of the body member, wherein the second protruding member includes:
- a (2-1)-th protruding member coupled to a front right side of the body member, and
- a (2-2)-th protruding member coupled to a rear right side of the body member, wherein the first coupling member includes:
- a (1-1)-th coupling member coupled to the (1-1)-th protruding member, and
- a (1-2)-th coupling member coupled to the (1-2)-th protruding member, wherein the second coupling member includes:
- a (2-1)-th coupling member coupled to the (2-1)-th protruding member, and
- a (2-2)-th coupling member coupled to the (2-2)-th protruding member, and wherein the reinforcing member includes:
- a front reinforcing member connected to the (1-1)-th protruding member, the (2-1)-th protruding member, the (1-1)-th coupling member, and the (2-1)-th coupling member, and
- a rear reinforcing member connected to the (1-2)-th protruding member, the (2-2)-th protruding member, the (1-2)-th coupling member, and the (2-2)-th coupling member.

9. The mobility vehicle platform of claim 8,
wherein the front reinforcing member is adhered to a front surface of the (1-1)-th protruding member, a front surface of the (2-1)-th protruding member, a front surface of the (1-1)-th coupling member, and a front surface of the (2-1)-th coupling member, and
wherein the rear reinforcing member is adhered to a rear surface of the (1-2)-th protruding member, a rear surface of the (2-2)-th protruding member, a rear surface of the (1-2)-th coupling member, and a rear surface of the (2-2)-th coupling member.

10. The mobility vehicle platform of claim 1, wherein the body part includes:
- a seat member disposed on the upper side of the body member and configured such that a passenger is seated thereon, and
- a pair of reception members disposed between the body member and the seat member to support the seat member, the pair of reception members being spaced apart from each other in leftward/rightward direction, and
wherein the pair of reception members form a space in which a wiring line is located.

11. The mobility vehicle platform of claim 10, wherein a pass-hole, through which the wiring line passes, is formed on a side surface of at least one reception member.

12. The mobility vehicle platform of claim 10, wherein the body part includes:
- a battery member disposed at a portion of the body member, which is located on a rear side of the seat member, and configured to supply electric power, and
- a control member disposed at a portion of the body member, which is located one at least any one of a left side or a right side of the seat member, and configured to control movement of the wheel part.

13. The mobility vehicle platform of claim 1, wherein the body part includes:
- a front bumper member coupled to a front surface of the body member, a front left side and a front right side of the front bumper member are rounded, and
- a rear bumper member coupled to a rear surface of the body member, a rear left side and a rear right side of the rear bumper member are rounded.

14. The mobility vehicle platform of claim 13, wherein the front bumper member includes:
- a pair of first front bumper parts coupled to a front surface of the body member to extend forwards, the first front bumper parts spaced apart from each other in a leftward/rightward direction, and
- a second front bumper part coupled to front surfaces of the pair of first front bumper parts, a front left side and a front right side of the second front bumper part are rounded.

15. The mobility vehicle platform of claim 1, wherein the protruding member includes:
- a first protruding part configured to contact the first coupling part and the second coupling part and of which a width in a leftward/rightward direction is constant; and
- a second protruding part disposed on a lower side of the first protruding part and of which a width in the leftward/rightward direction becomes shorter in a downward direction.

16. The mobility vehicle platform of claim 1,
wherein a first insertion recess is arranged in a first contact area, the first contact area being an area of the body member that contacts the protruding member,
wherein a second insertion recess having a shape corresponding to the first insertion recess is arranged in a second contact area, the second contact area being an area of the protruding member that contacts the body member, and
wherein the body part further includes an insertion member that is inserted into both of the first insertion recess and the second insertion recess.

17. The mobility vehicle platform of claim 16,
wherein the insertion member has a slot shape, and
wherein the first insertion recess and the second insertion recess have shapes corresponding to the insertion member, the first and second insertion recesses having widths that are smaller than a width of the insertion member.

* * * * *